United States Patent
Kikuchi et al.

(10) Patent No.: US 6,710,352 B2
(45) Date of Patent: Mar. 23, 2004

(54) CHARGED PARTICLE MEASURING APPARATUS

(75) Inventors: Jun Kikuchi, Tokyo (JP); Haruhisa Matsumoto, Tsukuba (JP); Hideki Koshiishi, Tsukuba (JP); Takashi Nozaki, Moriya (JP); Shigeru Takehisa, Moriya (JP)

(73) Assignees: National Space Development Agency of Japan, Tokyo (JP); Meisei Electric Co., Ltd., Tokyo (JP)

( * ) Notice: Subject to any disclaimer, the term of this patent is extended or adjusted under 35 U.S.C. 154(b) by 0 days.

(21) Appl. No.: 10/330,701

(22) Filed: Dec. 27, 2002

(65) Prior Publication Data

US 2003/0158678 A1 Aug. 21, 2003

(30) Foreign Application Priority Data

Dec. 28, 2001 (JP) ....................... 2001-400026

(51) Int. Cl.[7] .................. H01J 37/304; H01J 37/26
(52) U.S. Cl. ..................... 250/397; 250/305
(58) Field of Search ............ 250/397, 305, 250/396 R

(56) References Cited

U.S. PATENT DOCUMENTS

| | | | | |
|---|---|---|---|---|
| 5,331,161 A | * | 7/1994 | Ohdomari et al. | 250/309 |
| 5,345,085 A | * | 9/1994 | Prior | 250/491.1 |
| 5,892,237 A | * | 4/1999 | Kawakami et al. | 250/492.22 |
| 6,414,318 B1 | * | 7/2002 | UberI et al. | 250/389 |

* cited by examiner

Primary Examiner—John R. Lee
Assistant Examiner—Paul M. Gurzo
(74) Attorney, Agent, or Firm—Abelman, Frayne & Schwab

(57) ABSTRACT

A charged particle measuring apparatus discriminates the types of charged particles accurately and the energy precisely, measures high-energy charged particles precisely, and detects a failure of the apparatus to continue measurement in a mode corresponding to the failure. Outputs from first and second detectors are used as first and second addresses, respectively. The second detector includes a plurality of detectors. The output from a third detector is used as information about whether or not certain charged particles penetrate the second detector. The loss energy characteristics of charged particles to be measured are expressed in the first and second addresses. The number of times the charged particles are measured for loss energy are counted with respect to the addresses. When the series of detectors constituting the first, second, and third detectors suffers a failure, a measurement mode excluding any failed detector is employed to continue measurement.

4 Claims, 12 Drawing Sheets

CHARGED PARTICLE MEASURING APPARATUS

BACKGROUND OF THE INVENTION

1. Field of the Invention

The present invention relates to a charged particle measuring apparatus for measuring the types and energy of charged particles in a field where a plurality of charged particles (e.g., electrons, protons, α particles, and so on) exist together, such as in space and in a space ship.

2. Description of the Related Art

Conventionally, charged particles have been measured for types and energy by using a telescope type measuring apparatus having a plurality of detectors in layers. In order to measure the total energy of a high-energy charged particle incident on the detectors, it has been considered necessary for the detectors to have sufficient thicknesses so that the total energy of the incident changed particle is absorbed within the detectors. For this reason, there have been developed ΔE telescope type charged particle measuring apparatuses in which a plurality of detectors and absorbers are arranged in combination, and improved ΔE·E telescope type charged particle measuring apparatuses. FIG. 9 shows a block diagram of a conventional ΔE telescope type charged particle measuring apparatus which measures electrons, protons, and α particles for energy. FIG. 10 shows theoretical calculations of the relationship between the energy which charged particles lose to form electron-hole pairs in the detectors (hereinafter, referred to as loss energy) and the total energy of the charged particles prior to incidence (hereinafter, referred to as particle energy) for situations where the charged particles are incident on the ΔE telescope type charged particle measuring apparatus shown in FIG. 9. FIG. 11 is a conceptual diagram showing the configuration of detectors in a conventional ΔE·E telescope type charged particle measuring apparatus. FIG. 12 shows a block diagram of the conventional ΔE·E telescope type charged particle measuring apparatus. With reference to FIGS. 9 and 10, description will first be given of the conventional ΔE telescope type measuring apparatus.

In FIG. 9, the reference numeral 1 represents a charged particle, and 201–203 absorbers for absorbing the energy of the charged particle. The absorber 201 is made of aluminum of 0.1 mm in thickness. The absorber 202 is made of copper of 2 mm in thickness. The absorber 203 is made of tantalum of 2 mm in thickness. The reference numerals 204–207 represent detectors, each of which is a silicon semiconductor detector of 0.2 mm in thickness. The reference numerals 208 represent amplifying units, 209 a trigger generating unit, 210 a three-channel pulse-height discriminating unit, and 211 a data processing unit.

When the charged particle 1 is incident on the ΔE telescope type charged particle measuring apparatus, the detectors 204–207 generate electron-hole pairs if the charged particle 1 passes therethrough or impinges thereon. The amplifying units 208 detect these electron-hole pairs and convert them into analog pulse signals proportional to the number of electron-hole pairs generated.

The electron-hole pairs generated by the detector 204 are converted by the amplifying unit 208 into an analog pulse signal for output. The output is applied to the three-channel pulse-height discriminating unit 210. The three-channel pulse-height discriminating unit 210 discriminates the incident charged particle among an electron, a proton, and an α particle. The result is output as an address 1 to the data processing unit 211.

Now, the method of discriminating a charged particle in the three-channel pulse-height discriminating unit 210 will be described with reference to FIG. 10.

In FIG. 10, the axis of ordinates on the left shows the loss energy of the incident charged particle 1 on a logarithmic scale in units of mega-electron volts (MeV). The axis of abscissas shows the particle energy of the incident charged particle on a logarithmic scale in units of MeV.

L1, L2, and L3 shown on the right axis of ordinates in FIG. 10 are 0.05 MeV, 0.4 MeV, and 6 MeV, respectively, which are values predetermined for discriminating the types of charged particles. The curves designated by S1–S4 are ones obtained from theoretical calculations of the relationship between the loss energy and particle energy of charged particles detected by the detectors 204–207, respectively. The curves are classified into three curve groups which represent the types of incident charged particles, namely, electron, proton, and α particle. If the loss energy of the charged particle concerned falls between L1 and L2, the incident charged particle is discriminated as an electron. If the loss energy of the charged particle concerned falls between L2 and L3, the incident charged particle is discriminated as a proton. If the loss energy of the charged particle concerned exceeds L3, the incident charged particle is discriminated as an α particle. When the charged particle is a proton, the rising parts of the curves S1–S4 lie in the electron area below L2. Charged particles detected in this area are discriminated as electrons even if they are protons. However, such occasions are extremely rare and will thus be left ignored. The same also holds for the rising parts of the curves S1–S4 when the charged particle is an α particle.

The output, or the analog pulse signal, converted by the amplifying unit 208 from the electron-hole pairs detected by the detector 204 is applied to the trigger generating unit 209. If the output applied exceeds a threshold value for noise distinction which is set in the trigger generating unit 209, the trigger generating unit 209 generates a trigger signal and applies the trigger signal to the data processing unit 211.

The three-channel pulse-height discriminating unit 210 contains the values of analog pulse signals corresponding to L1, L2, and L3 of FIG. 10 above. The three-channel pulse-height discriminating unit 210 compares the values of analog pulse signals corresponding to L1, L2, and L3 with the output, or the analog pulse signal, converted by the amplifying unit 208 from the electron-hole pairs generated by the detector 204, and thereby discriminates the type of the charged particle. As described above, the result is output as the address 1 to the data processing unit 211.

The detectors 205–207 generate electron-hole pairs when the charged particle 1 passes therethrough or impinges thereon. The amplifying units 208 apply analog pulse signals proportional to the number of electron-hole pairs to the data processing unit 211.

In response to the trigger signal from the trigger generating unit 209, the data processing unit 211 determines up to what detectors generate the analog pulse signals, based on the inputs of the analog pulse signals proportional to the number of electron-hole pairs generated by the detectors 205–207. Take, for example, a case where the discrimination of the charged particle 1 by the three-channel pulse-height discriminating unit 210 results in a proton, and the detectors 204 and 205 generate analog pulse signals while the detector 206 does not. From FIG. 10, it is determined that the particle energy of this proton falls within the range of 6.1 MeV, which is shown by the rising part of the curve S2 of the proton group, and 20 MeV, which is shown by the rising part of the curve S3 of the proton group (hereinafter, the sections of particle energy range will be referred to as energy channels). The result of determination is an address 2.

Using the address 1 and the address 2, or the output from the three-channel pulse-height discriminating unit 210 and the outputs from the amplifying units 208 of the detectors 204–207, the data processing unit 211 cumulatively adds the frequencies of occurrence of the events that charged particles are measured for the respective energy channels, with respect to each type of the charged particles. The frequencies are accumulated into memories of those addresses provided in the data processing unit 211. The contents of the memories are transmitted to the ground at regular time intervals to obtain data of the charged particles by type and by energy channel.

In this way, the types and particle energy of charged particles incident on the charged particle measuring apparatus can be measured by measuring the charged particles for loss energy.

As shown in FIG. 10, the energy for charged particles to lose in the detectors 204–207 decreases to the right. Then, where the charged particles are high in particle energy has the problem that protons can get into the electron area and α particles the proton area, causing errors in the distinction of the charged particles.

Besides, in this ΔE telescope type charged particle measuring apparatus, the number of detectors determines the number of energy channels as described above. To increase the number of energy channels of charged particles, it is thus necessary to increase detectors and absorbers in number.

Now, a ΔE·E telescope type charged particle measuring apparatus will be described with reference to FIGS. 11 and 12.

In FIG. 11, the reference numeral 1 represents a charged particle, 301 a ΔE detector, 302 an E' detector, and 303 an Erej detector. In FIG. 12, the reference numeral 1 represents a charged particle, 311–315 detectors, 316 amplifying units, 317 an adding unit (A), 318 an adding unit (B), 319 a 16-channel pulse-height discriminating unit, 320 an operating unit, 321 a four-channel particle discriminating unit, 322 trigger generating units, 323 a match detecting unit, and 314 a data processing unit.

When a charged particle is in a domain of relatively low energy, the energy dE for the charged particle to lose in moving inside a substance by a minute distance dx can be approximated as follows:

$$-dE/dx \propto MZ^2/E \qquad \text{Eq. (1)}$$

Here, M is the mass of the charged particle, Z the charge of the charged particle, and E the particle energy of the charged particle. The equation (1) modifies into:

$$E \times (-dE/dx) \propto MZ^2 \qquad \text{Eq. (2)}$$

Given that $MZ^2$ on the right side has a value of 1 for a proton, the ratios to a deuteron, a triton, $^3$He, and $^4$He are 2, 3, 12, and 16, respectively. The value of $E \times (-dE/dx)$ on the left side of the equation (2) is determined from the observed data on the loss energy of the charged particle, thereby discriminating the type of the charged particle.

The ΔE·E telescope type charged particle measuring apparatus shown in FIGS. 11 and 12 adopts the foregoing principle to discriminate charged particles and measure the energy channels of the charged particles.

In FIG. 11, the ΔE detector 301 detects –dE/dx of the equation (2) (hereinafter, –dE/dx will be referred to as ΔE) and the E' detector 302 detects the remaining energy E' (E'=E–ΔE). On the condition that the incident of the charged particle makes the ΔE detector 301 and the E' detector 302 produce outputs and the Erej detector 303 produce no output, ΔE+E' equals to the particle energy E. The foregoing equation (2) thus modifies into:

$$(\Delta E + E') \times \Delta E \propto MZ^2 \qquad \text{Eq. (3)}$$

The value of (ΔE+E')×ΔE of the foregoing equation (3) is determined and the ratio to that of a proton is used to discriminate the type of the charged particle.

The ΔE detector 301 of FIG. 11 corresponds to the detector 311 of FIG. 12. The E' detector 302 of FIG. 11 corresponds to the detectors 312–314 of FIG. 12. The Erej detector 303 of FIG. 11 corresponds to the detector 315 of FIG. 12. The amplifying units 316 and the trigger generating units 322 of FIG. 12 make the same operations as those of the amplifying units 208 and the trigger generating unit 209 of FIG. 9. Description thereof will thus be omitted here.

The output of the detector 311 past the amplifying unit 316 is applied as ΔE to the adding unit (A) 317, the operating unit 320, and the trigger generating unit 322. The outputs of the detectors 312–314 past the amplifying units 316 are applied to the adding unit (B) 318. The output of the detector 312 past the amplifying unit 316 is also applied to the trigger generating unit 322. The output of the detector 315 past the amplifying unit 316 is applied to the trigger generating unit 322. The adding unit (B) 318 adds the inputs from the three detectors to determine the above-mentioned E', and applies the output to the adding unit (A) 317. The adding unit (A) 317 adds the output ΔE from the detector 311 and the output E' from the adding unit (B) 318 to determine the particle energy ΔE+E', and applies the output to the 16-channel pulse-height discriminating unit 319 and the operating unit 320. The 16-channel pulse-height discriminating unit 319 discriminates the particle energy ΔE+E' in 16 levels. The result is output as an address 2 to the data processing unit 324.

The operating unit 320 performs an operation between the output ΔE from the detector 311 and the output ΔE+E from the adding unit (A) 317 to determine (ΔE+E')×ΔE, and outputs the same to the four-channel particle discriminating unit 321. The four-channel particle discriminating unit 321 discriminates among an electron, a proton, an α particle, and other heavy particles based on the ratio of the value of (ΔE+E')×ΔE to that of a proton. The result is output as an address 1 to the data processing unit 324.

When the analog pulse signals from the detectors 311 and 322 are applied to the match detecting unit 323 through the amplifying units 316 and the trigger generating units 322 as described above, the match detecting unit 323 judges the concurrence between the inputs from the detectors 311 and 312. If the two inputs are judged as being the trigger signals resulting from the incidence of the same charged particle on the detectors 311 and 312 and there is no trigger signal input from the detector 315, the match detecting unit 323 outputs a second trigger signal to the data processing unit 324. The data processing unit 324 performs data processing in response to the input of the second trigger signal.

Using the address 1 and the address 2, or the output of the four-channel particle discriminating unit 321 and the output of the 16-channel pulse-height discriminating unit 319, the data processing unit 324 cumulatively adds the frequencies of occurrence of the energy channels of charged particles with respect to each type of charged particle. The frequencies are accumulated into memories of those addresses provided in the data processing unit 324. The contents of the memories are transmitted to the ground at regular time intervals to obtain data on the charged particles by type and by energy channel.

In the foregoing circumstances, if the analog pulse signal from the detector 315 is applied to the match detecting unit 323 through the amplifying unit 316 and the trigger generating unit 322, the match detecting unit 323 outputs no trigger signal even when concurrence is observed between the two inputs from the detectors 311 and 312. The reason for this is that the presence of the analog pulse signal from the detector 315 indicates the penetration of the charged particle through the detector 314, in which case E' cannot be determined.

Consequently, when charged particles have so high energy as to penetrate the detector 314, the foregoing principle of this ΔE·E telescope type charged particle measuring apparatus is no longer applicable.

As described above, conventional ΔE telescope type measuring apparatuses have the problems that the types of incident charged particles are difficult to discriminate when the charged particles have higher particle energy, and that the detectors must be increased in number when an increase is intended of the energy channels to discriminate. Conventional ΔE·E telescope type measuring apparatuses have the problem that charged particles having so high energy as to penetrate the detectors cannot be measured. In addition, both types of measuring apparatuses have the problem that measurement cannot be continued in the event of a detector failure.

BRIEF SUMMARY OF THE INVENTION

The present invention has been achieved to solve the foregoing problems. It is thus a first object of the present invention to discriminate the types of charged particles accurately and the energy channels precisely. A second object is to detect a failure of the charged particle measuring apparatus while conducting measurement, and even when a detector or the like suffers a failure, continue the measurement in a mode corresponding to the failure.

To achieve the foregoing first and second objects, claim 1 of the invention provides a charged particle measuring apparatus comprising a first detector, a second detector, and a third detector arranged in the direction of incidence of charged particles, the second detector consisting of a plurality of detectors, loss energy characteristics of respective types of charged particles to be measured being expressed in two-dimensional addresses with an output from the first detector as a first address and outputs from the plurality of detectors constituting the second detector as a second address, the loss energy characteristics of respective types of charged particles being measured based on the two-dimensional addresses and the presence or absence of output from the third detector, the apparatus further comprising: a second random access memory for counting the number of times charged particles are measured for loss energy at the two-dimensional addresses, the loss energy characteristics of respective types of charged particles to be measured being expressed in the addresses; a read only memory containing segment numbers respectively given to a plurality of segments sections along the loss energy characteristics of respective types of charged particles to be measured, the loss energy characteristics of respective types of charged particles being expressed in the two-dimensional addresses with respect to each of a plurality of modes, the plurality of modes setting combinations of the first through third detectors excluding any one or more detectors for situations where the detector(s) out of the first detector, and/or the second detector consisting of the plurality of detectors, and/or the third detector suffer(s) a failure; and a first random access memory for counting the number of times the charged particles are measured for loss energy under addresses shown by the segment numbers in the read only memory corresponding to the mode, wherein outputs from the first random access memory and the second random access memory are used to discriminate the types of charged particles and measure the energy thereof.

To achieve the foregoing first and second objects, the invention also provides the charged particle measuring apparatus, wherein: the read only memory contains a segment number corresponding to all the addresses other than those given the segment numbers in each mode; and the apparatus includes a random access memory for counting the number of times the charged particles are measured for loss energy under the segment number.

To achieve the foregoing first and second objects, the invention also provides the charged particle measuring apparatus, wherein a segment or a plurality of segments having the same segment number(s) regardless of whether or not a charged particle penetrates the second detector is/are divided into two addresses each, depending on the presence or absence of the output from the third detector.

To achieve the foregoing first and second objects, the invention also provides the charged particle measuring apparatus, wherein the plurality of detectors constituting the second detector are identical in thickness and material.

BRIEF DESCRIPTION OF THE SEVERAL VIEWS OF THE DRAWINGS

These and other objects and advantages of the present invention will become clear from the following description with reference to the accompanying drawings, wherein.

DETAILED DESCRIPTION OF THE INVENTION

Hereinafter, an embodiment of the present invention will be described in detail with reference to FIGS. 1–8 and Table 1.

Figure 1:
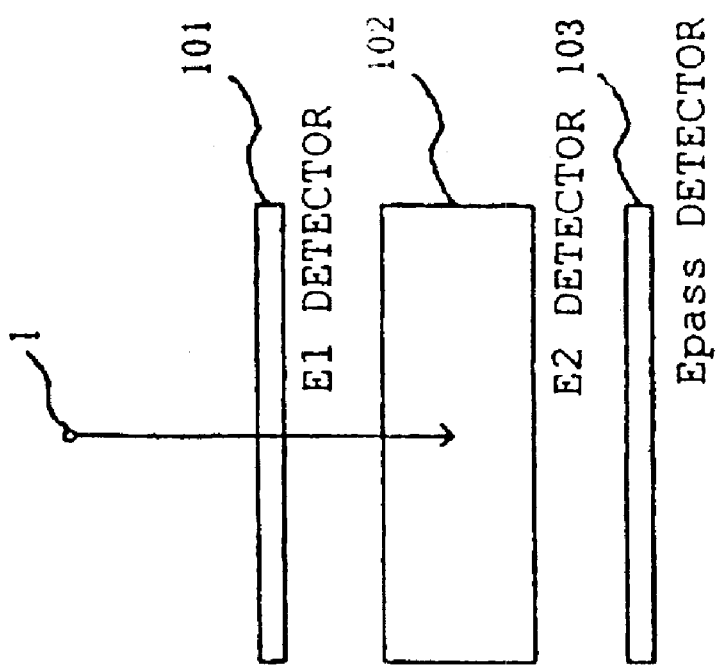
FIG. 1 is a conceptual diagram showing the configuration of a charged particle measuring apparatus which is the embodiment of the present invention.
Figure 2:
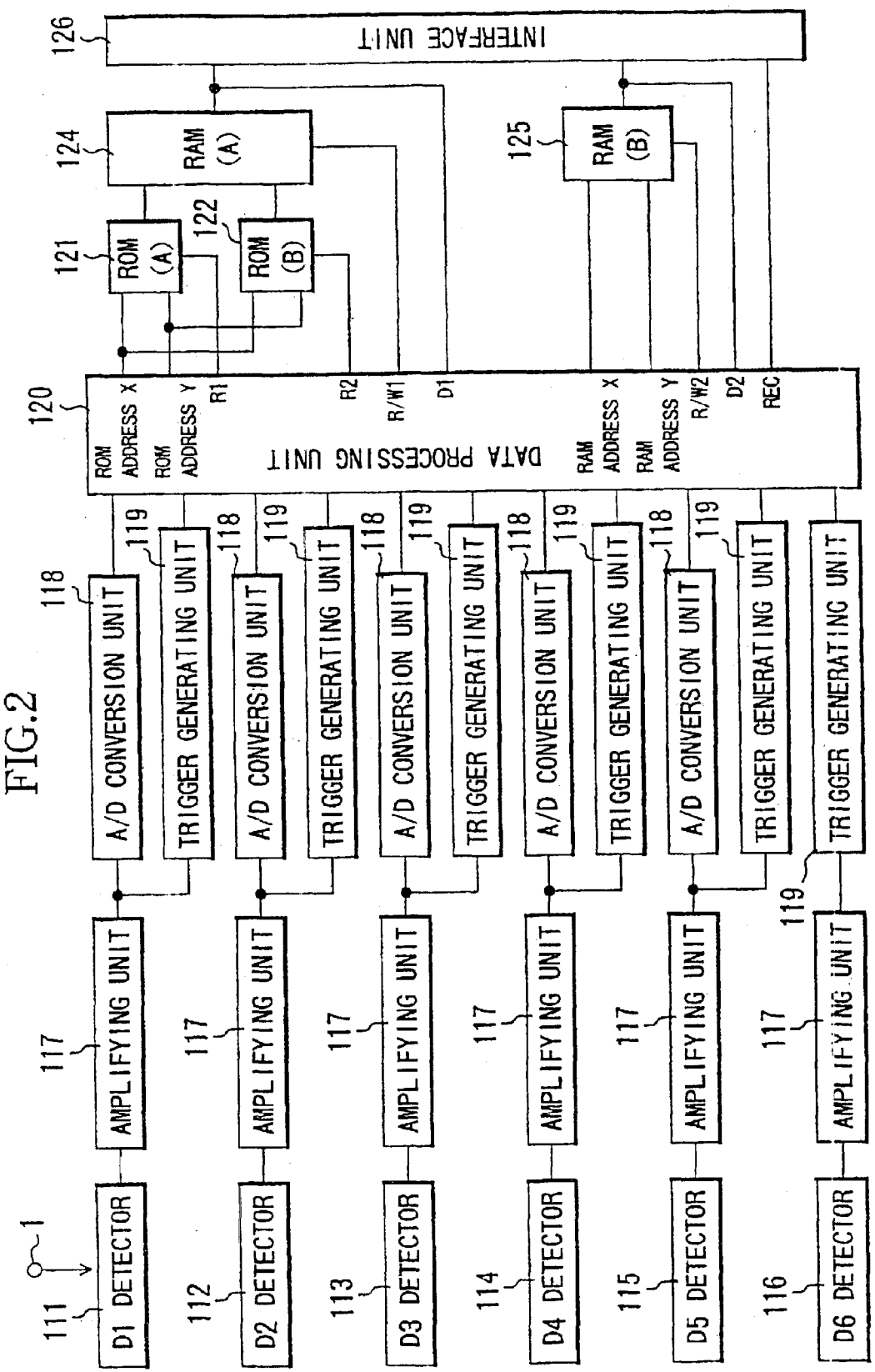
FIG. 2 is a block diagram of the charged particle measuring apparatus, the embodiment of the present invention.
Figure 3:
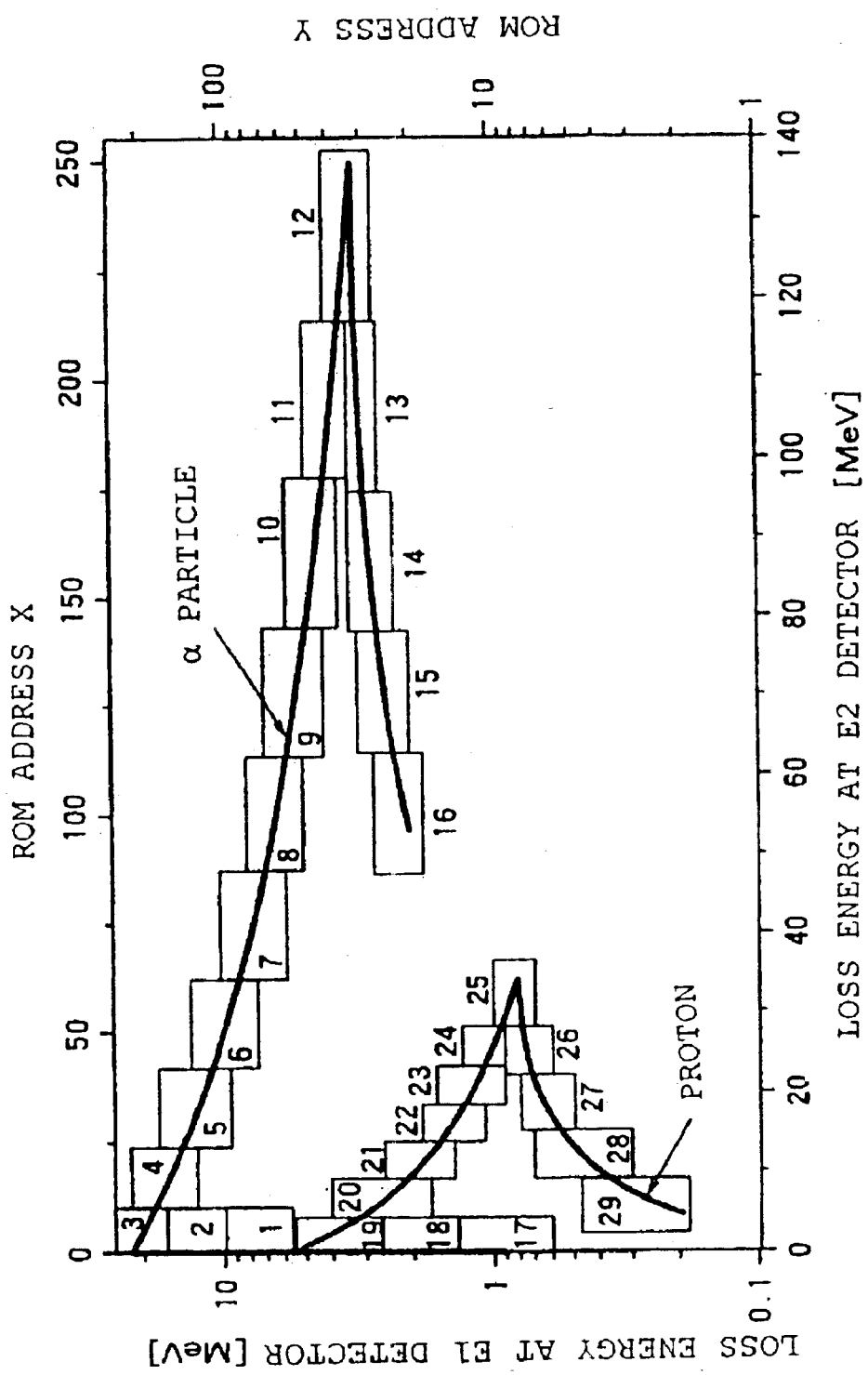
FIG. 3 is an explanatory diagram showing characteristic curves that show the relationship between the loss energy of charged particles at the E1 detector and the E2 detector, with ROM addresses assigned thereto.
Figure 4:
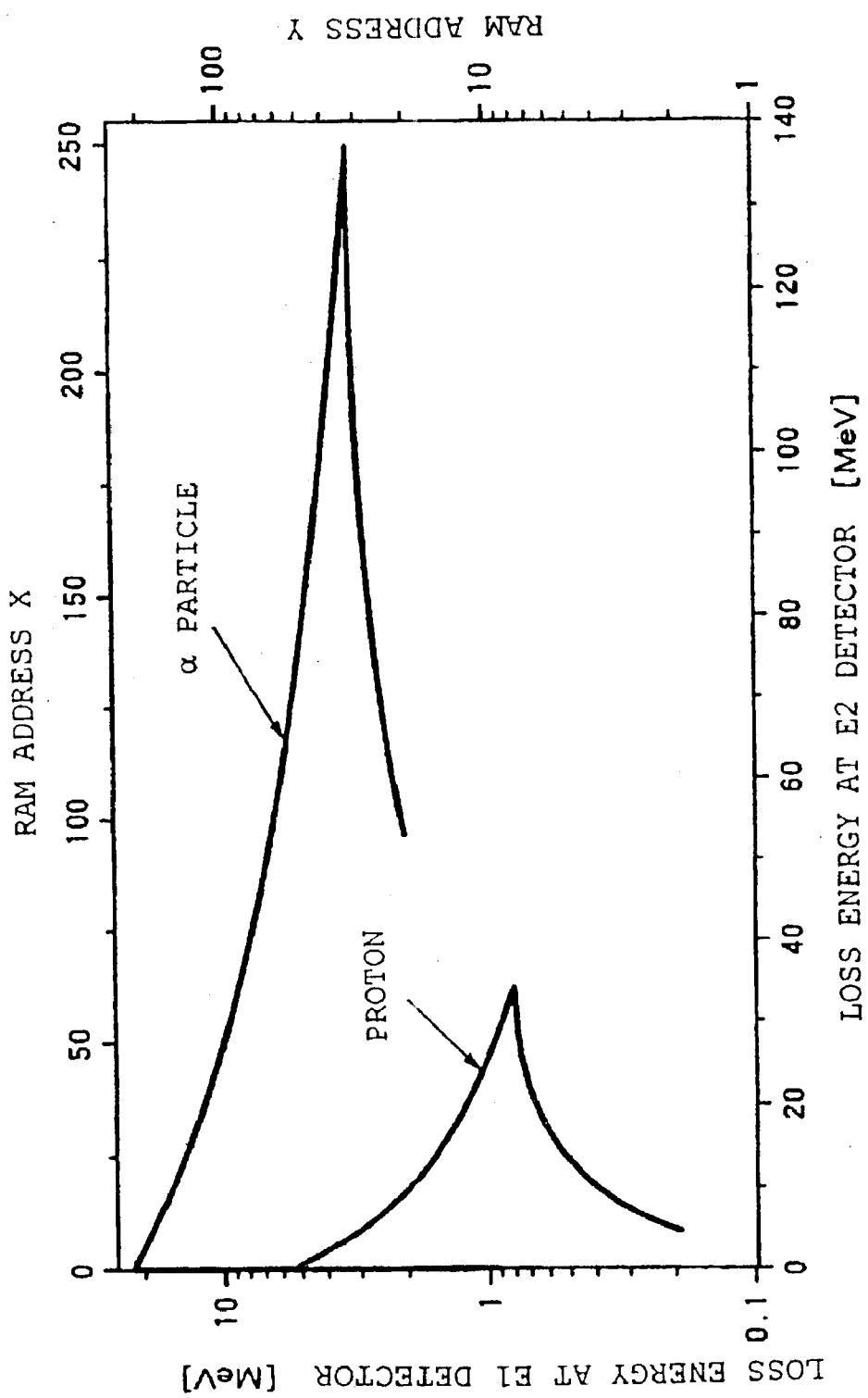
FIG. 4 is an explanatory diagram showing the characteristic curves that show the relationship between the loss energy of charged particles at the E1 detector and the E2 detector, with RAM addresses assigned thereto.
Figure 5:
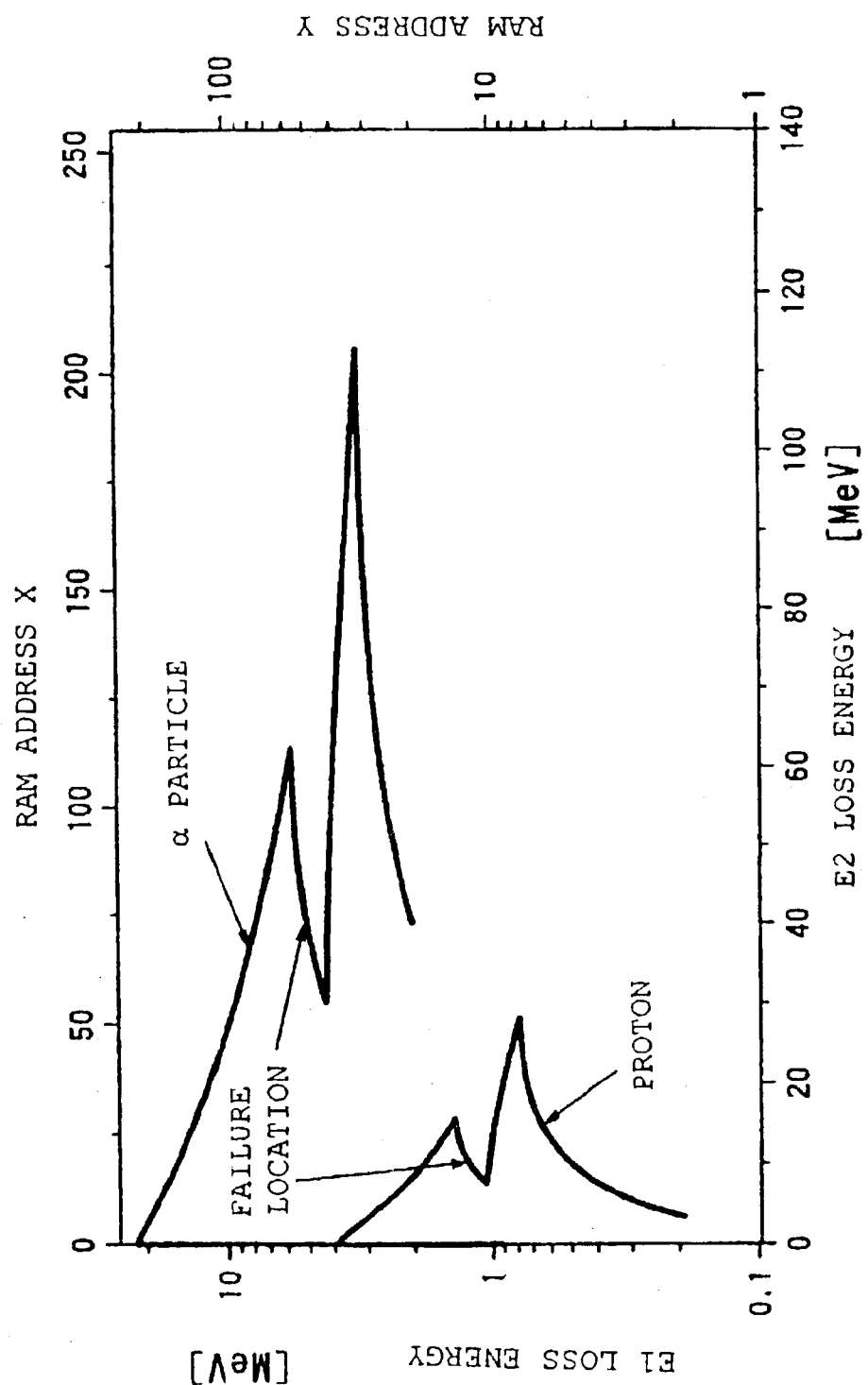
FIG. 5 is an explanatory diagram showing the characteristic curves that show the relationship between the loss energy of charged particles at the E1 detector and the E2 detector in cases where the charged particle measuring apparatus suffers a failure.
Figure 6:
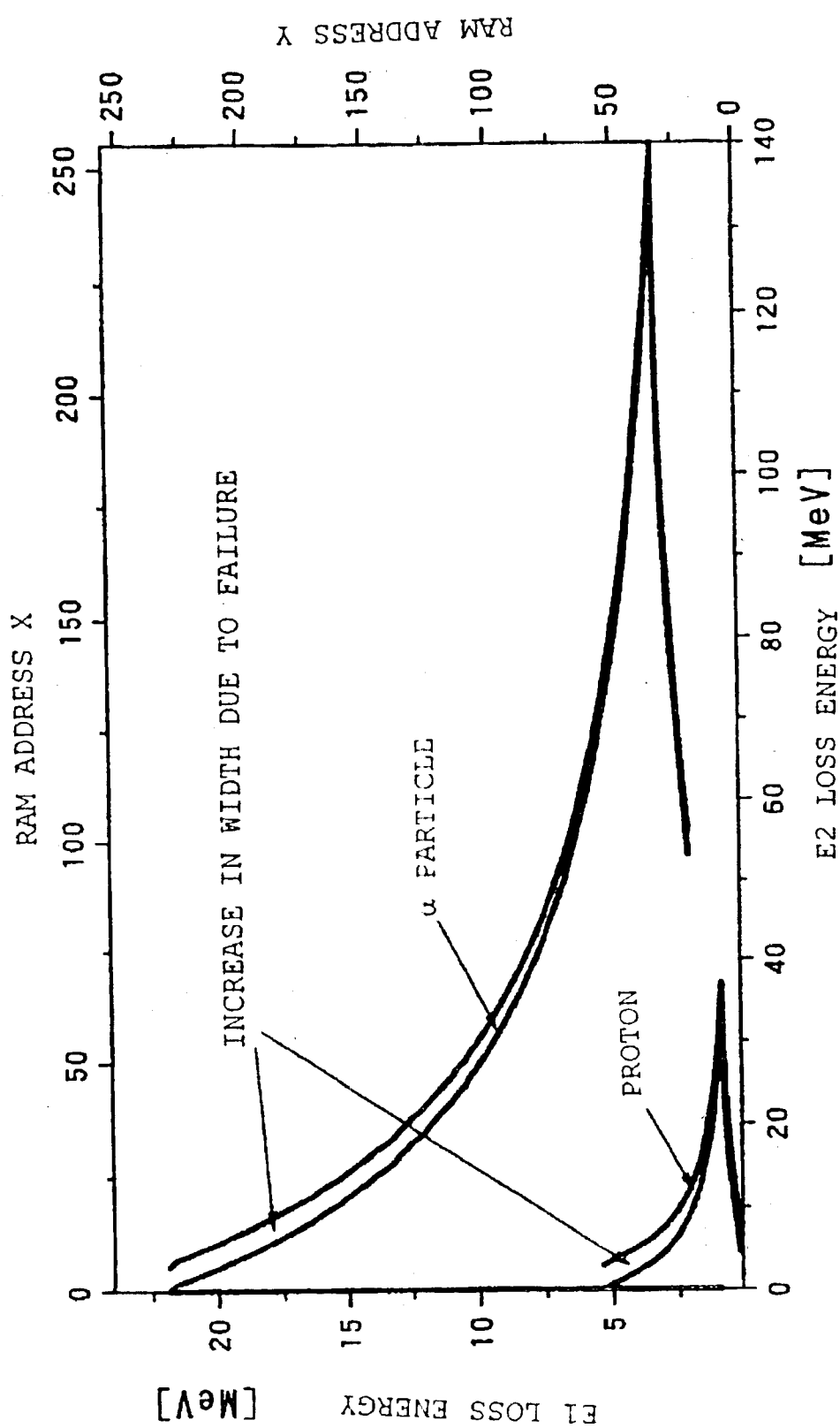
FIG. 6 is an explanatory diagram showing the characteristic curves that show the relationship between the loss energy of charged particles at the E1 detector and the E2 detector in cases where the charged particle measuring apparatus suffers a different failure than in FIG. 5.
Figure 7:
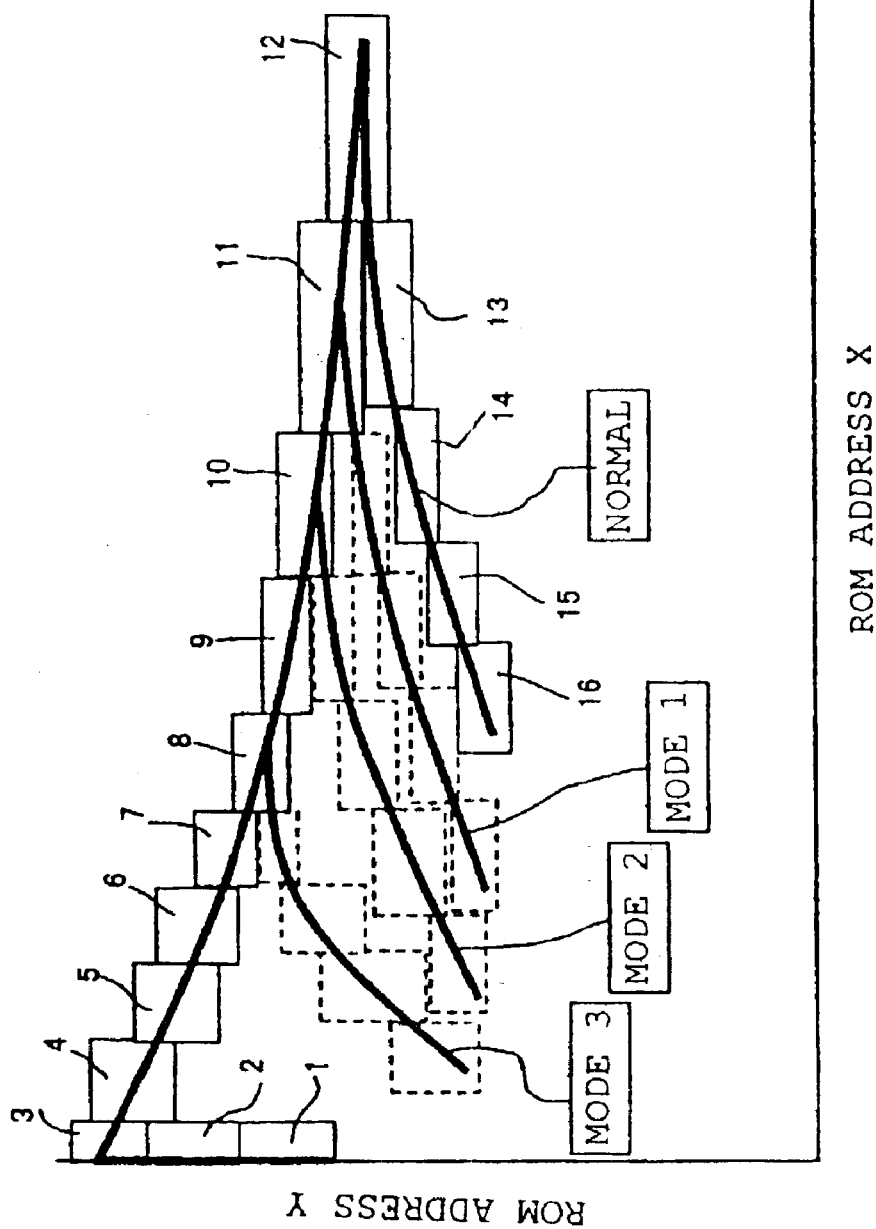
FIG. 7 is an explanatory diagram for explaining the contents written in the ROM (A) 121.
Figure 8:
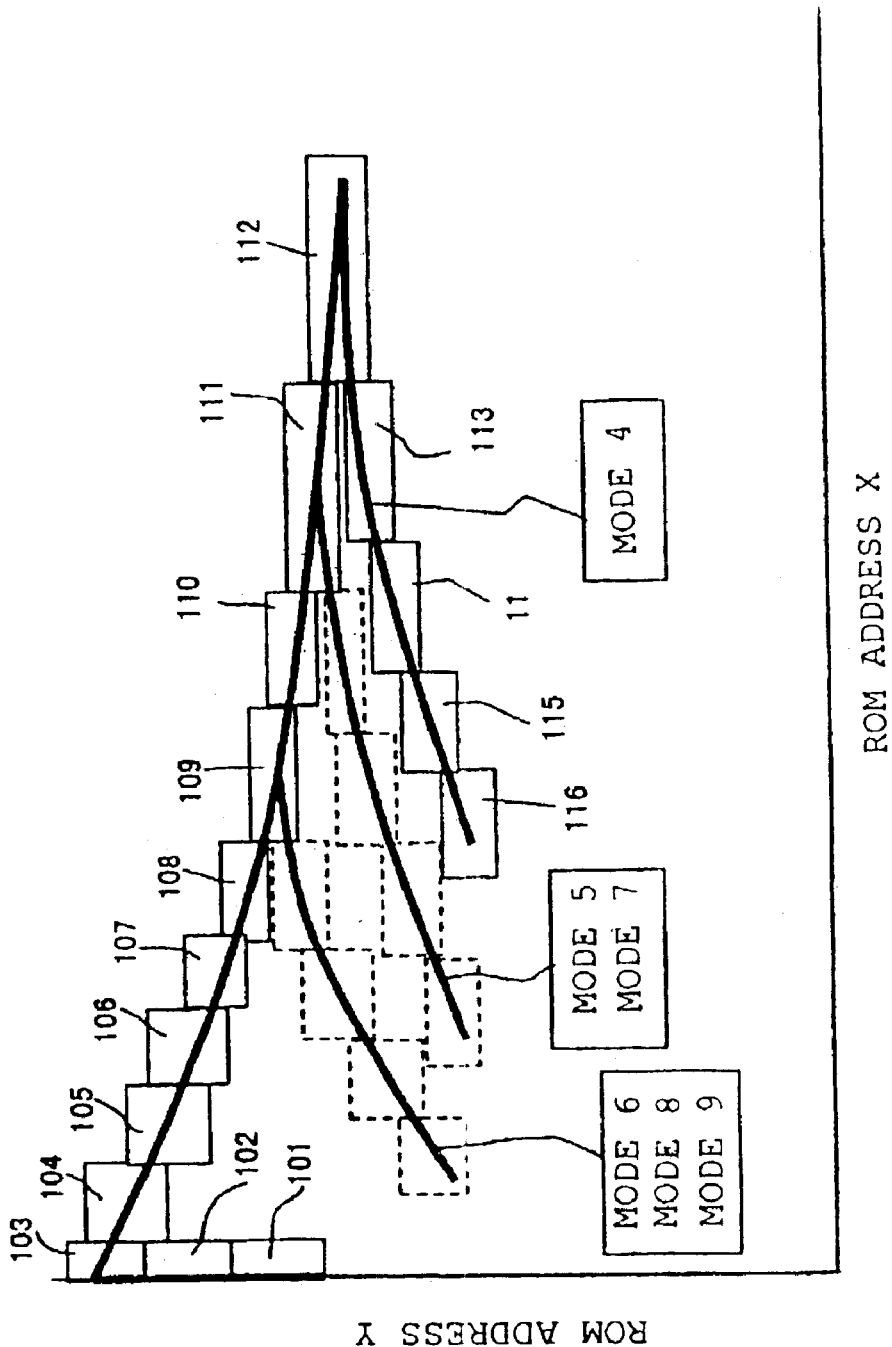
FIG. 8 is an explanatory diagram for explaining the contents written in the ROM (B) 122.
Figure 9:
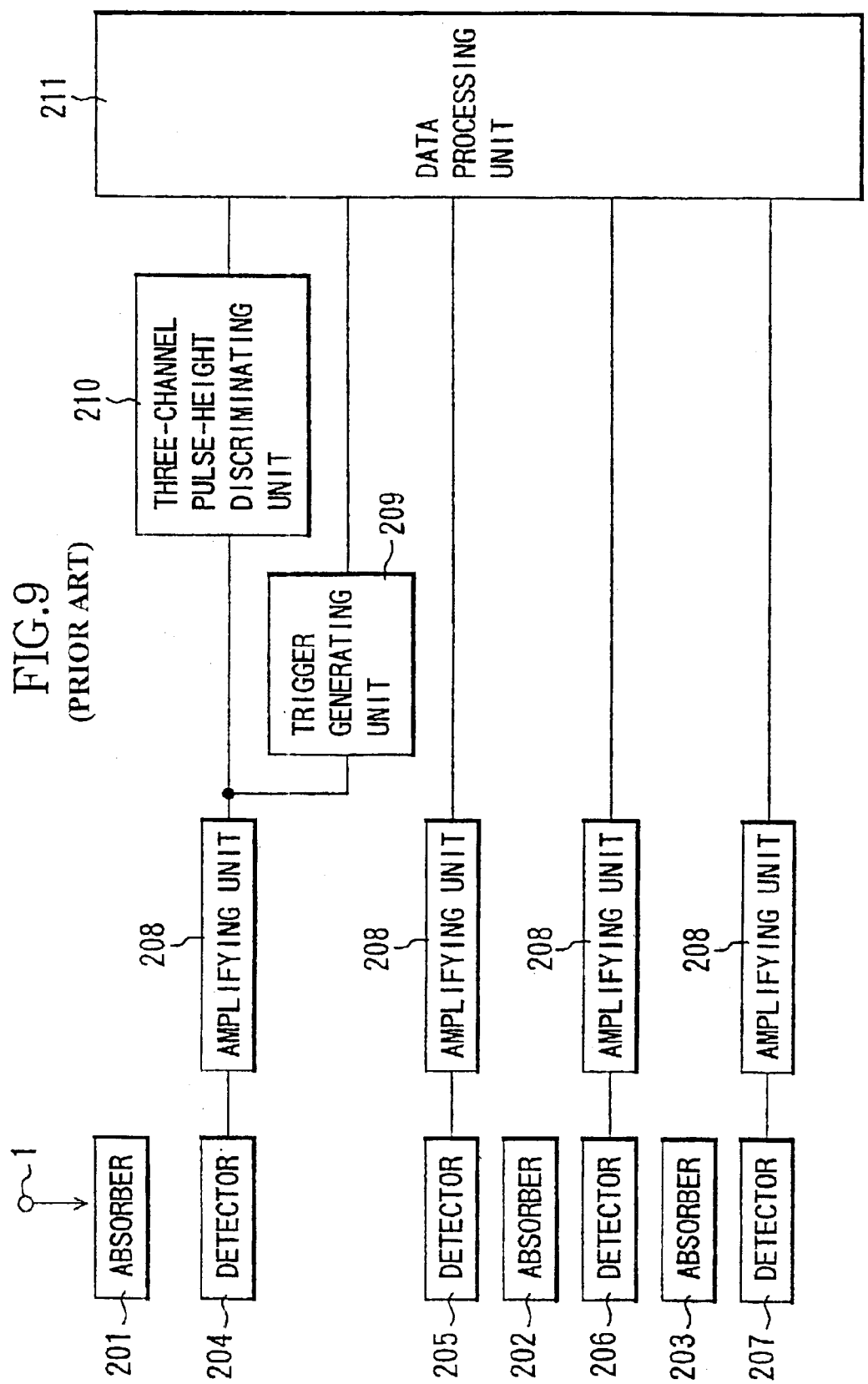
FIG. 9 is a block diagram of a ΔE telescope type charged particle measuring apparatus in the prior art.
Figure 10:
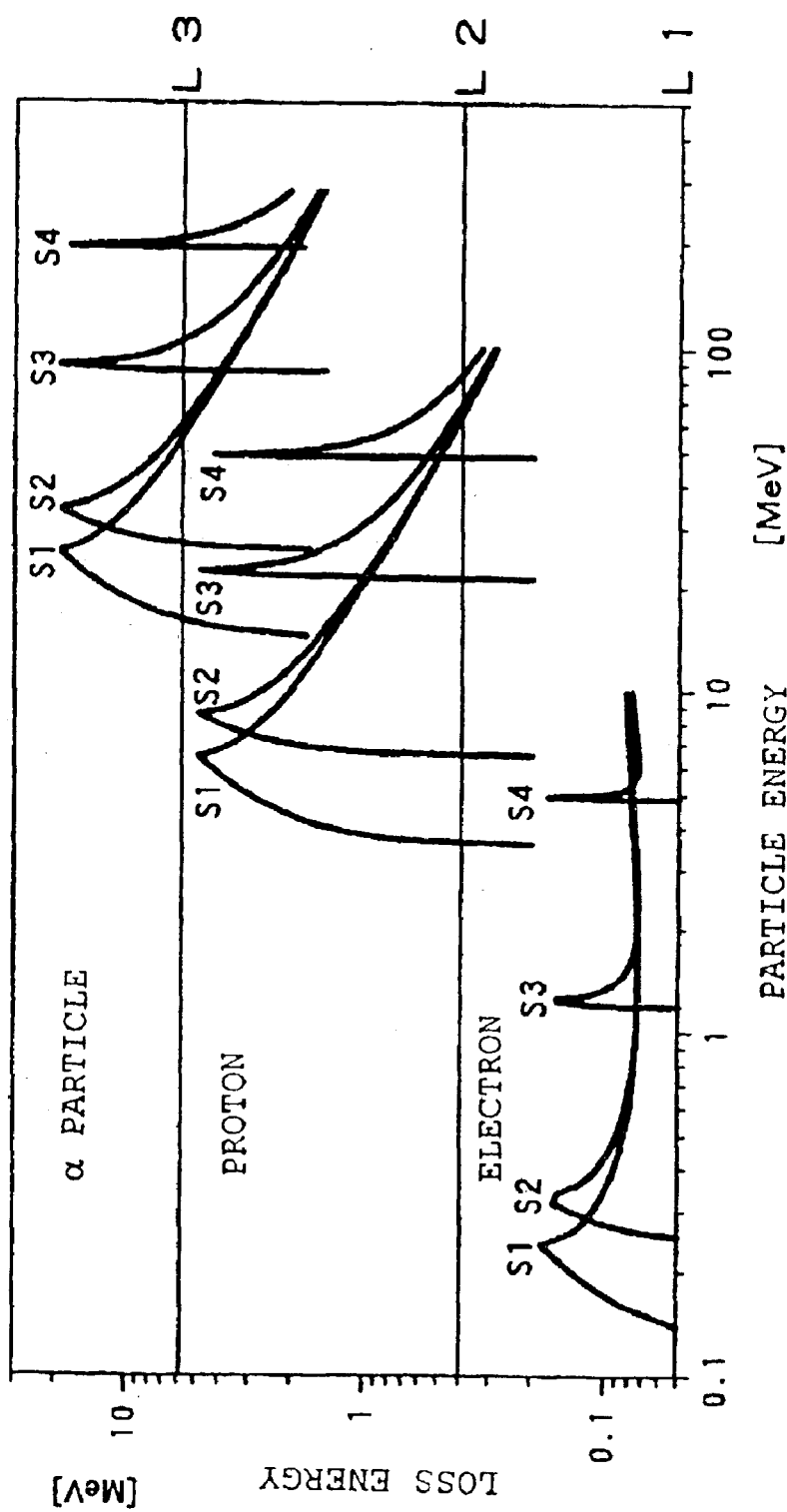
FIG. 10 is a characteristic chart showing the relationship between the loss energy and particle energy of charged particles incident on the ΔE telescope type charged particle measuring apparatus shown in FIG. 9.
Figure 11:
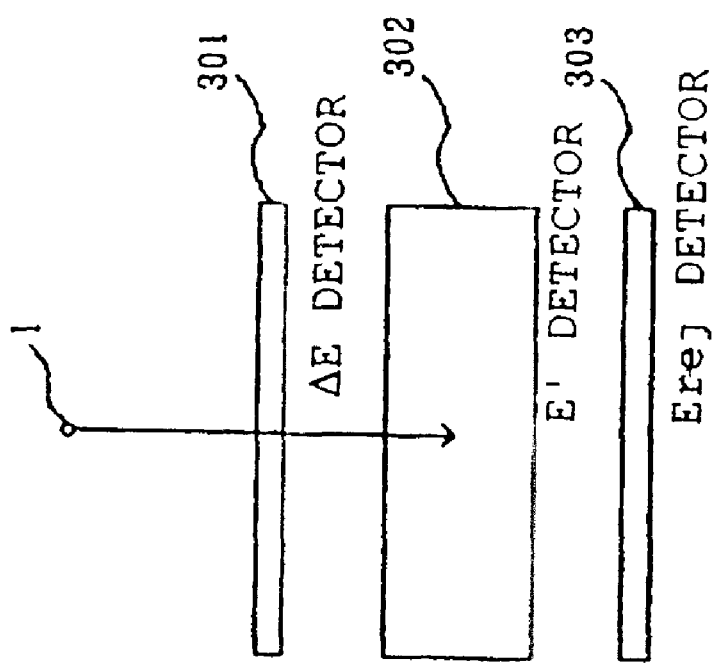
FIG. 11 is a conceptual diagram showing the configuration of a ΔE·E telescope type charged particle measuring apparatus in the prior art.
Figure 12:
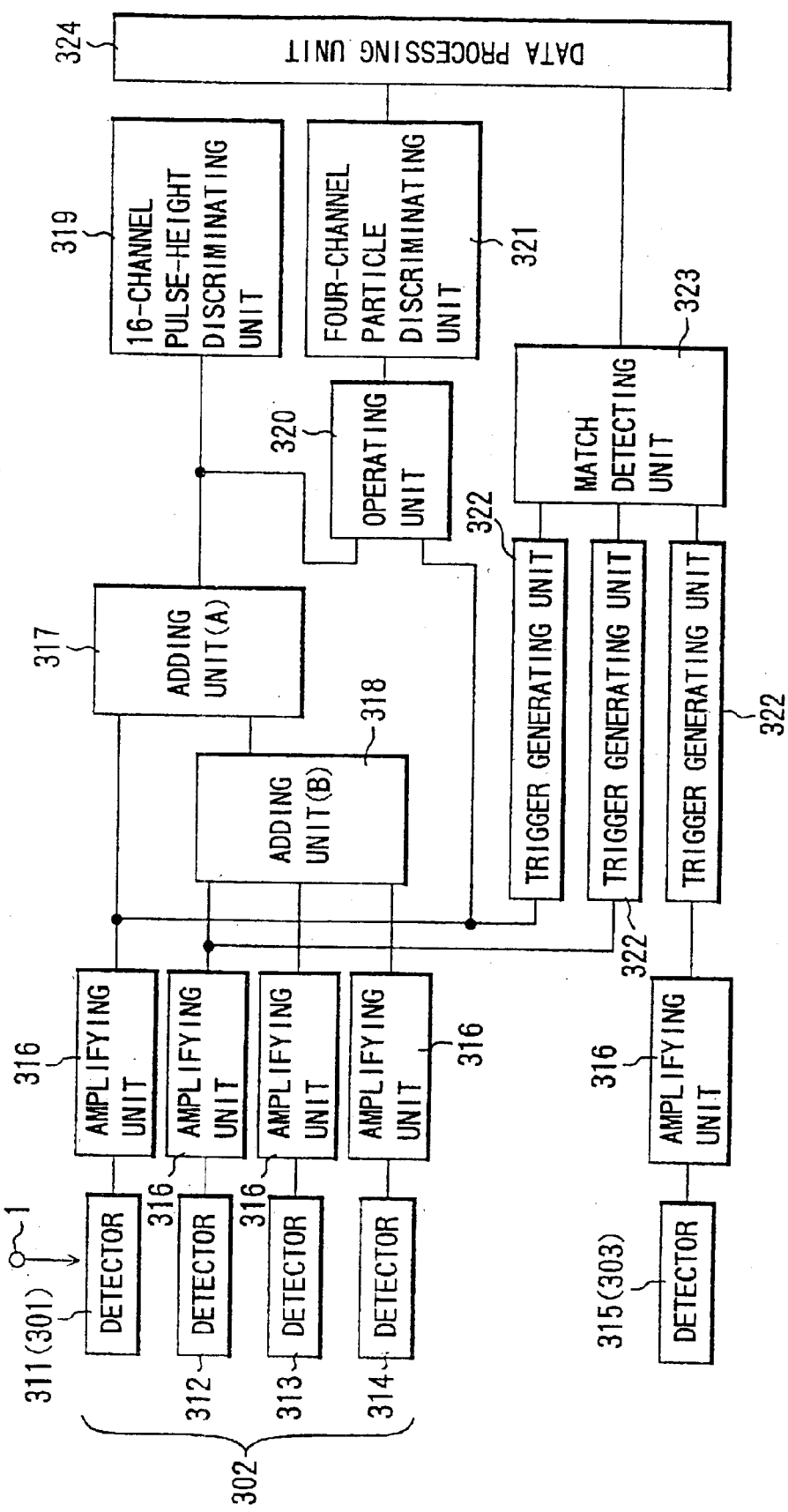
FIG. 12 is a block diagram of a ΔE·E telescope type charged particle measuring apparatus in the prior art.

FIG. 1 is a conceptual diagram showing the configuration of a charged particle measuring apparatus which is the embodiment of the present invention. FIG. 2 is a block diagram of the charged particle measuring apparatus, the embodiment of the present invention. FIG. 3 is an explanatory diagram showing characteristic curves that show the relationship between the loss energy of charged particles at an E1 detector and the loss energy of the charged particles at an E2 detector, with addresses of read only memories assigned thereto. The read only memories are hereinafter referred to as ROMs, which may be, for example, fuse-type read only memories. FIG. 4 is an explanatory diagram showing characteristic curves that show the relationship between the loss energy of charged particles at the E1 detector and the loss energy of the charged particles at the E2 detector, with addresses of random access memories assigned thereto, with the random access memories hereinafter referred to as RAMs. FIG. 5 is an explanatory diagram showing characteristic curves that show the relationship between the loss energy of charged particles at the E1 detector and the loss energy of the charged particles at the E2 detector in cases where the charged particle measuring apparatus suffers a failure. FIG. 6 is an explanatory diagram showing characteristic curves that show the relationship between the loss energy of charged particles at the E1 detector and the loss energy of the charged particles at the E2 detector in cases where the charged particle measuring apparatus suffers a different failure than in FIG. 5. FIGS. 7 and 8 are explanatory diagrams showing characteristic curves that show the relationship between the loss energy of a charged particle at the E1 detector and the loss energy of the charged particle at the E2 detector corresponding to failure modes, with ROM addresses assigned thereto.

Table 1 shows combinations of the E1 detector, the E2 detector, the Epass detector, and the ROMs corresponding to the failure modes.

Initially, referring to FIG. 1, the reference numeral 1 represents a charged particle, 101 an E1 detector (first detector), 102 an E2 detector (second detector), and 103 an Epass detector (third detector).

The E1 detector 101 and the E2 detector 102 are ones intended to determine the loss energy of the charged particle 1 from the number of electron-hole pairs resulting from the incidence of the charged particle 1 on the respective detectors. The E2 detector 102 typically has a greater thickness than that of the E1 detector 101, and a plurality of detectors are used for the E2 detector 102. The Epass detector 103 is intended to detect whether or not the charged particle 1 penetrates the E2 detector 102.

In FIG. 2, the reference numeral 1 represents a charged particle, 111 a D1 detector made of a 250-μm-thick silicon semiconductor, and 112 through 116 D2–D6 detectors each made of a 1.5-mm-thick silicon semiconductor. The reference numerals 117 represent amplifying units, 118 analog-to-digital conversion units (hereinafter, referred to as A/D conversion units), 110 trigger generating units, 120 a data processing unit, 121 a ROM (A), 122 a ROM (B), 124 a RAM (A) (first random access memory), 125 a RAM (B) (second random access memory), and 126 an interface unit.

The above-mentioned thicknesses and materials of the D1–D6 detectors 111–116 are just a few examples, and may be freely selected according to the purpose of the measuring apparatus. The number of detectors may also be adjusted. The D2–D5 detectors 112–115 to constitute the E2 detector can effectively cope with detector failures as will be described later if they are made identical in material and thickness.

In the present embodiment, when the charged particle measuring apparatus functions normally, the E1 detector 101 of FIG. 1 corresponds to the D1 detector 111 of FIG. 2, the E2 detector 102 of FIG. 1 the D2–D5 detectors 112–115 of FIG. 2, and the Epass detector 103 of FIG. 1 the D6 detector 116 of FIG. 2. The charged particle measuring apparatus of the present embodiment can also conduct measurement even if part of the charged particle measuring apparatus suffers a failure. Failed cases will be described later.

In FIG. 1, assume that the E1 detector 101 is a silicon semiconductor detector of 250 μm in thickness, the E2 detector 102 a silicon semiconductor detector of 6 mm in thickness, and the Epass detector 103 a silicon semiconductor detector of 1.5 mm in thickness. Then, the correspondence between the detectors shown in FIGS. 1 and 2 is as follows: E1 detector 110≡D1 detector 111; E2 detector 102≡D2 detector 112+D3 detector 113+D4 detector 114+D5 detector 115; and Epass detector 103≡D6 detector 116.

Next, with reference to FIGS. 1 and 3, description will be given of the basic idea about the method of discriminating the type of a charged particle and measuring the particle energy of the same in this charged particle measuring apparatus.

In FIG. 3, the left axis of ordinates and the bottom axis of abscissas show the loss energy of a charged particle 1 detected by the E1 detector 101 and the loss energy of the charged particle 1 detected by the E2 detector 102, respectively, in units of MeV. The right axis of ordinates and the top axis of abscissas show the loss energy on the left axis of ordinates and the loss energy on the bottom axis of abscissas, respectively, in terms of 8-bit address values. The method of conversion into 8-bit address values will be described later.

The characteristic curves of FIG. 3 show loss energy for protons and α particles up to 250 MeV in particle energy to lose in the E1 detector 101 and the E2 detector 102 of FIG. 1. The loss characteristic curves are theoretically obtained from the physical properties for situations where the E1 detector 101 and the E2 detector 102 are of the above-mentioned thicknesses and materials.

In FIG. 3, the segments given segment numbers, arranged on the characteristic curves of the proton and α particle represent RAM addresses to be described later. For each charged particle, the segment number is determined from the intersection between the address value output as a ROM address Y (first address) which is converted from the loss energy detected by the E1 detector 101 and the address value output as a ROM address X (second address) which is converted from the loss energy detected by the E2 detector 102. The contents of the RAM addressed by the segment number determined are counted up. The contents stored in the RAM within a certain period are read to determine the types and energy of the charged particles.

Initially, referring to FIG. 3, description will be given of the particle energy a charged particle 1 has before the incidence on the detectors and the loss energy it loses by the incidence on the detectors in the case where the charged particle 1 is an a particle.

When the incident charged particle 1 is low in particle energy and does not penetrate the E1 detector 101, the E2 detector 102 does not produce any output. The loss energy of the charged particle is output from the E1 detector 101 alone, and is plotted on the left axis of ordinates. The portion plotted under the segment numbers 1, 2, and, partly, 3 forms the characteristic curve of that charged particle. In this portion of the characteristic curve, the particle energy and the loss energy are equal to each other.

When the incident charged particle 1 penetrates the E1 detector 101 but not the E2 detector 102, the curve is plotted concave upward, sloping down to the right. The portion shown under the segment numbers 3 and 12 in part and under the segment numbers 4 through 11 forms the characteristic curve of that charged particle. This portion of the characteristic curve shows that the particle energy is the sum of the loss energy in the E1 detector 101 and the loss energy in the E2 detector 102.

When the incident charged particle 1 penetrates both the E1 detector 101 and the E2 detector 102, the energy to vanish in the E1 detector 101 and the E2 detector 102 decreases in value. The curve is plotted concave downward, sloping down to the left. The portion plotted under the segment number 12 in part and under the segment numbers 13 through 16 forms the characteristic curve of that charged particle. This portion of the characteristic curve shows that the particle energy is the sum of the loss energy in the E1 detector 101 and the loss energy in the E2 detector 102 plus the energy that the charged particle has after the penetration of the E2 detector 102. The energy the charged particle has after the penetration of the E2 detector 102 can be theoretically determined since the materials and thicknesses of the E1 and E2 detectors 101 and 102 are known.

The characteristic curve shown under the segment number 12 in FIG. 3 makes an abrupt change depending on whether or not the charged particle 1 penetrates the E2 detector 102. Whether the E2 detector 102 is penetrated or not is difficult to determine from the outputs of the E1 detector 101 and the E2 detector 102 alone.

The Epass detector 103 is the one intended to determine if the charged particle 1 penetrates the E2 detector 102. Based on the presence or absence of the output from the Epass detector 103, the loss energy resolution at the segment number 12 can be improved.

The loss energy determined from the output of the E1 detector 101 is converted into the ROM address Y, and the loss energy determined from the output of the E2 detector 102 is converted into the ROM address X. The contents of the RAM addressed by the segment number at the intersection of the ROM address Y and the ROM address X are counted up. The charged particle measuring apparatus of the embodiment of the invention thus measures charged particles within a predetermined period for types and energy channels.

Now, with reference to FIGS. 2, 3, and 4, the operation of the charged particle measuring apparatus will be detailed for normal cases.

When the charged particle 1 is incident on the charged particle measuring apparatus, the D1 detector 111 through the D6 detector 116 up to which the charged particle 1 passes through or is incident on generate electron-hole pairs. The amplifying units 117 detect these electron-hole pairs and convert them into analog pulse signals proportional to the number of electron-hole pairs generated by the respective detectors. The outputs, or the analog pulse signals converted by the amplifier units 117, are applied to the A/D conversion units 118 and the trigger generating units 119. The A/D conversion units 118 convert the analog pulse signals into digital signals and output the same to the data processing unit 211.

The trigger generating units 119 generate trigger signals and output the same to the data processing unit 120 when the analog pulse signals applied exceed threshold values for noise distinction which are set in the trigger generating units 119.

The digital signal to be output from the D1 detector 111 through the amplifying unit 117 and the A/D conversion unit 118 to the data processing unit 120 (hereinafter, referred to as the digital signal from the D1 detector 111; the same terms are employed for the other detectors) is output to the data processing unit 120 as corresponding to the loss energy in the E1 detector of FIG. 1 above. When the data processing unit 120 receives a trigger signal from the trigger generating unit 119 in response to the analog pulse signal coming from the D1 detector 111 through the amplifying unit 117, it decides that the charged particle 1 is incident on the charged particle measuring apparatus, and starts data processing.

The digital signal from the D1 detector 111 is converted into an 8-bit ROM address Y and output to the ROM (A) 121. The D2 detector 112 through the D5 detector 115 generate electron-hole pairs when the charged particle 1 passes through or is incident on the respective detectors. The digital signals from the D2–D5 detectors 112–115 are added by the data processing unit 120. The added value is converted into an 8-bit ROM address X and output to the ROM (A) 121 as corresponding to the loss energy in the E2 detector of FIG. 1 above.

For the ROM address X and the ROM address Y, the ROM (A) 121 has 8 bits of or 255 addresses each. As shown in FIG. 3, the addresses are sectioned into the segments 1–16 corresponding to the characteristic curve of α particles and segments 17–29 corresponding to the characteristic curve of protons. With α particles, the segment number 12 is further divided into upper and lower segments though not shown in the diagram. With protons, the segment number 25 is further divided into upper and lower segments though not shown in the diagram. Each of the segments has an identical address to be stored as the contents for all the addressed within the single segment. For example, the memory contains "7" where addressed within the section 7. This "7" represents an address "7" of the RAM (A) 124.

When the intersection of the ROM address Y and the ROM address X output from the data processing unit 120 falls on the segment 7, for example, the ROM (A) 121 outputs the address "7" to the RAM (A) 124 in response to a read signal output from an R1 terminal of the data processing unit 120. The data processing unit 120 outputs a read signal to the RAM (A) 124 from its R/W1 terminal, and reads the value stored at the address "7" of the RAM (A) 124 through its D1 terminal. The data processing unit 120 adds 1 to the value read through the D1 terminal, outputs the value through the D1 terminal again, and sends out a write signal from the R/W1 terminal to the RAM (A) 124, thereby updating the value at the address "7" of the RAM (A) 124.

Accordingly, the contents of the RAM (A) 124 show the frequencies of loss energy corresponding to the respective addresses of the charged particles incident on the charged particle measuring apparatus (hereinafter, the frequencies of loss energy corresponding to the respective addresses of charged particles will be referred to as loss energy frequency data). In the present embodiment, the RAM (A) 124 has a capacity of 16 bits per address.

As in the method of determining the ROM address Y and the ROM address X described above, the data processing unit 120 also converts the digital signal from the D1 detector 111 and the digital signals from the D2–D5 detectors 112–115 into an 8-bit RAM address Y and an 8-bit RAM address X, respectively, and outputs the same to the RAM (B) 125. In addition, the data processing unit 120 outputs a read signal to the RAM (B) 125 from its R/W2 terminal, and reads the value stored at that address of the RAM (B) 125 through its D2 terminal. The data processing unit 120 adds 1 to the value read through the D2 terminal, outputs the value through the D2 terminal again, and sends out a write signal from the R/W2 terminal to the RAM (B) 125, thereby updating the value at that address of the RAM (B) 125. In the present embodiment, the RAM (B) 125 has a capacity of 16 bits per address.

As long as the charged particle measuring apparatus functions normally, the ROM addresses and the RAM addresses are such that the ROM address Y and the RAM address Y are equal to each other and the ROM address X and the RAM address X are equal to each other. As will be described later, however, the ROM addresses and the RAM addresses can differ from each other if the charged particle measuring apparatus suffers a failure and one of the failure modes shown in Table 1 is selected.

In such cases, the RAM (B) 125 stores loss energy frequency data at addresses corresponding to the characteristic curves shown in FIG. 4.

Next, description will be given of a difference in processing that occurs depending on whether or not the digital signal from the D6 detector 116 of FIG. 2 corresponding to the Epass detector 103 of FIG. 1 is input to the data processing unit 120.

As described above, whether or not the charged particle 1 penetrates the E2 detector 102 is difficult to determine from the outputs of the E1 detector 101 and the E2 detector 102 alone. Then, the data processing unit 120 determines the presence or absence of input of the digital signal from the D6 detector 116. If there is no input, the charged particle 1 can be judged as not penetrating the E2 detector. If there is the input, the charged particle 1 can be judged as penetrating the E2 detector.

Specifically, in the ROM addresses shown in FIG. 3, the segment number 12 is divided into upper and lower segments for the case of α particles, and the segment number 25 for the case of protons. If there is no input of the digital signal from the D6 detector 116, measurements are processed as corresponding to the upper segments. If there is the input of the digital signal from the D6 detector 116, measurements are processed as corresponding to the lower segments.

The data stored in the RAM (A) 124 and the RAM (B) 125 is output to the interface unit 126 at regular time intervals in response to read signals output from the D1 terminal or D2 terminal of the data processing unit 120. The interface unit 126 transmits the loss energy frequency data from the RAM (A) 124 or the loss energy frequency data from the RAM (B) 125 to the ground.

In the foregoing example, the RAM (A) 124 has 31 addresses and thus is low in energy resolution. The RAM (A) 124 is given shorter time intervals, however, so as to perform data acquisition frequently for high time resolution. The RAM (B) 125 has 255×255 addresses and is high in energy resolution. Due to the enormous amount of information, the RAM (B) 125 is given longer time intervals for data acquisition than the RAM (A) 124, thus lowering the time resolution.

The charged particle measuring apparatus measures the types and particle energy of charged particles based on the loss energy frequency data of the charged particles obtained in such a method.

The foregoing description has dealt with the case where the charged particle measuring apparatus of the present embodiment functions normally without the occurrence of failures. Now, description will be given of the cases where part of the charged particle measuring apparatus suffers a failure.

Because of its intended use, the charged particle measuring apparatus of the present embodiment is often used in a radiation-filled space. Thus, the detectors which are exposed directly to radiation can deteriorate to cause failures more frequently as compared to portions other than the detectors.

Hereinafter, description will first be given of possible failures and phenomena resulting from the failures with reference to FIGS. 5 and 6. Then, measures to be taken in the events of failures will be described.

The failures concerning the detectors are classified into ones in which no signal is output from a certain detector or detectors and ones in which greater noise arises in the signal(s) from a certain detector or detectors. Most of the time, these two types of failures are both ascribable to the deterioration of the detectors due to radiation. It is known that even if the detectors are deteriorated thus, the loss energy of charged particles in those deteriorated detectors remains unchanged while the outputs from the deteriorated detectors disappear or increase in noise.

FIG. 5 is a diagram for situations where the D3 detector 113 of the charged particle measuring apparatus shown in FIG. 2 suffers a failure and the digital signal from the D3 detector 113 is not input to the data processing unit 120. Here, the loss energy in the E1 detector 101 the D1 detector 111 and the loss energy in the E2 detector 102 the D2 detector 112+the D4 detector 114+ the D5 detector 115 are theoretically determined for protons and α particles, and plotted in association with the RAM address X and the RAM address Y. It is shown that in the event of the foregoing failure, the loss energy frequency data of protons and α particles will be added into the addresses shown by the characteristic curves of FIG. 5.

In this way, when a certain detector suffers a failure and the digital signal from the failed detector is no longer input to the data processing unit 120, the loss energy detected varies greatly. The loss energy frequency data written in the RAM (B) 125 can thus be checked to determine the occurrence of a failure and the detector suffering the failure.

Although any of the detector suffers a failure, the loss energy in that failed detector can be determined theoretically from the known material and thickness thereof unless the detector suffers mechanical damage such as cracking (such mechanical damage hardly occurs). Moreover, when the charged particle 1 penetrates the failed detector, the loss energy in that detector can also be determined theoretically. Thus, the theoretically determined loss energy of the failed detector can be added to the loss energy measurement to determine the loss energy of the charged particle 1. This makes it possible to determine the particle energy of the charged particle 1.

FIG. 6 is a diagram for situations where any of the D2–D5 detectors 112–115 in the charged particle measuring apparatus shown in FIG. 2 suffers a failure and there arises noise of 3 MeV in equivalent energy. Here, the loss energy in the E1 detector 101 the D1 detector 111, and the loss energy in the E2 detector 102 the D2 detector 112+ the D3 detector 113+ the D4 detector 114+ the D5 detector 115 are theoretically determined for protons and α particles, and plotted in association with the RAM address X and the RAM address Y. It is shown that in the event of the foregoing failure, the loss energy frequency data of protons and α particles will be added into addresses falling between the respective two characteristic curves of protons and α particles shown in FIG. 6. This results in wider distributions of the loss energy frequency data than those assumed for the charged particles which are shown in FIG. 4. The loss energy frequency data written in the RAM (B) 125 can thus be checked for the occurrence of the failure.

If the occurrence of noise is found from the loss energy frequency data in the RAM (B) 125, the data processing unit 120 conducts, under the instruction from the ground, measurement with each detector separated in succession. The loss energy frequency data in the RAM (B) 125 can be checked to identify the noise-occurring detector. The digital signal from that detector can be excluded from the data processing to continue measurement.

In the charged particle measuring apparatus of the present embodiment, when a failure occurs in any of the detectors shown in FIG. 2, the correspondence between the D1–D6 detectors 111–116 and the E1, E2, and Epass detectors must be set depending on the failed detector(s) so that the RAM (A) 124 can acquire the loss energy frequency data. As described in conjunction with the example of FIG. 5 above, the loss energy frequency data in the RAM (B) 125 shows the states of the detectors themselves. According to the states of the detectors, the correspondence with the E1 detector 101, the E2 detector 102, and the Epass detector 103 are switched automatically.

In order for the RAM (A) 124 to acquire the loss energy frequency data, at least three consecutive normal detectors are required and the three consecutive detectors must be assigned to the E1 detector, the E2 detector, and the Epass detector, respectively. Hereinafter, referring to Table 1 and FIGS. 7 and 8, description will be given of failure modes and the combinations of detectors corresponding to the failure modes.

TABLE 1

MEASUREMENT MODES

| MODE | FAILED DETECTOR(S) | E1 | E2 | Epass | ROM IN USE |
|---|---|---|---|---|---|
| NORMAL | NONE | D1 | D2 + D3 + D4 + D5 | D6 | ROM1 |
| MODE1 | D6 | D1 | D2 + D3 + D4 | D5 | ROM1 |
| MODE2 | D5 (+D6) | D1 | D2 + D3 | D4 | ROM1 |
| MODE3 | D4 (+D5 + D6) | D1 | D2 | D3 | ROM1 |
| MODE4 | D1 | D2 | D3 + D4 + D5 | D6 | ROM2 |
| MODE5 | D1 + D6 | D2 | D3 + D4 | D5 | ROM2 |
| MODE6 | D1 + D5 (+D6) | D2 | D3 | D4 | ROM2 |
| MODE7 | D2 (+D1) | D3 | D4 + D5 | D6 | ROM2 |
| MODE8 | D2 + D6 (+D1) | D3 | D4 | D5 | ROM2 |
| MODE9 | D3 (+D1 + D2) | D4 | D5 | D6 | ROM2 |

Table 1 is stored in a memory of the data processing unit 120. It shows failure modes predetermined in order for the RAM (A) 124 to acquire the loss energy frequency data under the foregoing condition, showing the correspondence between the E1, E2, and Epass detectors and the D1–D6 detectors 111–116 shown in FIG. 2 in the respective failure modes.

As shown in Table 1, either one of the ROM (A) 121 and the ROM (B) 122 is used depending on the failure mode. Now, the contents written in the ROM (A) 121 or the ROM (B) 122 will be described with reference to FIGS. 7 and 8, taking a particles for example.

FIG. 7 is a diagram for explaining the contents written in the ROM (A) 121, the contents corresponding to the case where the charged particle measuring apparatus functions normally and to the modes 1–3 shown in Table 1. The contents written in the ROM (A) 121 for situations where the charged particle measuring apparatus functions normally have been explained above with reference to FIG. 3. The following provides the explanation on the modes 1–3.

The mode 1 is for situations where the D6 detector 116 fails. As shown in Table 1, the D1 detector 111 corresponds to the E1 detector, the D2–D4 detectors 112–114 the E2 detector, and the D5 detector 115 the Epass detector. When α particles are incident on the charged particle measuring apparatus that is set in the mode 1, the loss energy frequency data is added into the addresses shown by the characteristic curve denoted MODE 1 according to the particle energy of the α particles. The characteristic curve in the mode 1 shows that the D5 detector 115 is penetrated in the middle of the segment number 11, depending on the magnitude of the particle energy of the α particles. The characteristic curve is the same as in normal cases up to the segment number 11 and branches off from the normal characteristic curve in the middle of the segment number 11, thereby tracing the characteristic curve shown in FIG. 7. As in FIG. 3 above, segments shown by the dotted lines are provided for the branched characteristic curve, and not-shown appropriate segment numbers are given to the segments.

The mode 2 is for situations where the D5 detector 115 fails. The denotation "(+D6)" in the failed detector column of Table 1 indicates that the mode 2 is selected regardless of whether the D6 detector 116 is failed or not. The same holds for the other modes, and description thereof will be omitted below.

In the mode 2, the D1 detector 111 corresponds to the E1 detector, the D2 and D3 detectors 112 and 113 the E2 detector, and the D4 detector 114 the Epass detector. The characteristic curve in the mode 2 is the same as in normal cases up to the segment number 10 and branches off from the normal characteristic curve in the middle of the segment number 10, thereby tracing the characteristic curve shown in FIG. 7. As in FIG. 3 above, segments shown by the dotted lines are provided for the branched characteristic curve, and not-shown appropriate segment numbers are given to the segments.

The mode 3 is for situations where the D4 detector 114 fails. It is shown that the mode 3 is selected regardless of whether the D5 and D6 detectors 115 and 116 are failed or not.

In the mode 3, the D1 detector 111 corresponds to the E1 detector, the D2 detector 112 the E2 detector, and the D3 detector 113 the Epass detector. The characteristic curve in the mode 3 is the same as in normal cases up to the segment number 8 and branches off from the normal characteristic curve in the middle of the segment number 8, thereby tracing the characteristic curve shown in FIG. 7. As in FIG. 3 above, segments shown by the dotted lines are provided for the branched characteristic curve, and not-shown appropriate segment numbers are given to the segments.

Among the segments in each mode, the one where the E2 detector is penetrated, i.e., the one where the characteristic curve branches off from the characteristic curve of normal cases is divided into upper and lower segments as in the normal cases described in conjunction with FIG. 3. This division is intended for distinction between measurements before and after the penetration of the E2 detector.

FIG. 8 is a diagram for explaining the contents written in the ROM (B) 122, the contents corresponding to the modes 4–9 shown in Table 1. The following provides explanation of the modes 4–9.

The mode 4 is for situations where the D1 detector 111 fails. As shown in Table 1, the D2 detector 112 corresponds to the E1 detector, the D3–D5 detectors 113–115 the E2 detector, and the D6 detector 116 the Epass detector. When α particles are incident on the charged particle measuring apparatus that is set in the mode 4, the loss energy frequency data is added into the addresses shown by the characteristic curve denoted MODE 4 according to the particle energy of the α particles. As in the foregoing description, segment numbers are given to the segments corresponding to the characteristic curve in the mode 4.

In the other modes, the D2–D6 detectors 112–116 are assigned to the E1, E2, and Epass detectors as shown in Table 1, and segment numbers are given to the segments corresponding to the characteristic curves in the respective modes. Explanation thereof will be omitted, being similar to the case of FIG. 7.

As shown in FIGS. 7 and 8, the segment numbers at the addresses shown by the intersections of the ROM addresses X and Y, established on the characteristic curves, are stored so that the ROM (A) 121 and the ROM (B) 122 contain the same segment number at all the addresses within each identical segment. The addresses correspond to the addresses of the RAM (A) 124. This is parallel to the description given with reference to FIG. 3 where the charged particle measuring apparatus functions normally. By the way, referring to FIG. 8, the same segments are assigned to the modes 5 and the mode 7, for example. Meanwhile, as shown in Table 1, different detectors are designated as the E1 detector in the respective modes. The loss energy for charged particles to be incident on the detector designated as the E1 detector differs between the modes accordingly. Thus, the particle energy in the respective modes is determined with consideration given to the loss energy of the charged particles. Incidentally, the number of segments shown in FIGS. 3, 7, and 8 are just a few examples. The segments may be adjusted freely in number and in shape according to the purpose of the measurement. In the foregoing description, the ROM address X, the ROM address Y, the RAM address X, and the RAM address Y are of 8 bits, and the RAM (A) 124 and the RAM (B) 125 are 16-bit memories. These bit counts are just a few examples, and different bit counts may be employed.

The foregoing description of the setting of the measurement modes based on detector failures has dealt with the failures of the detectors alone. Nevertheless, the same measurements as described above are obtained even if any of the amplifying units 117, the A/D conversion units 118, and the trigger generating units 119 connected to the failed detectors suffers a failure. The setting of the measurement modes can be performed as described above.

When the amplifying units 117, the A/D conversion units 118, and the trigger generating units 119 seem failed, a command for inspection may be given from the ground. This suspends the detector output between the seemingly-failed detector and the amplifying unit 117 by a not-shown method. Test pulses set separately are applied to the amplifying unit 117 to obtain the loss energy frequency data in the RAM (A) 124 or the RAM (B) 125. Then, the failure of the amplifying unit 117, the A/D conversion unit 118, and the trigger generating unit 119 can be detected from the loss energy frequency data.

As described above, the charged particle measuring apparatus of the present embodiment can measure the particle energy of the charged particle 1 by means of the two read only memories, the ROM (A) 121 and the ROM (B) 122. This is made possible by using, as described above, detectors of identical thickness and material as the D2–D5 detectors 112–115 corresponding to the E2 detector 102 of FIG. 1 when the charged particle measuring apparatus of FIG. 2 functions normally. If the D2 detector 112 through the D5 detector 115 differ from one another in thickness and material, read only memories equivalent to the ROM (B) 122 of the present embodiment must be provided as many as the number of modes shown in Table 1.

The interface unit 126 receives a command for mode setting from the ground, and sends out the mode information to the data processing unit 120. In accordance with the mode received, the data processing unit 120 sets the detectors corresponding to the E1, E2, and Epass detectors based on Table 1 stored in its memory. The data processing unit 120 also selects which to output the ROM address X and the ROM address Y to, the ROM (A) 121 or the ROM (B) 122, by selecting either of the R1 terminal and the R2 terminal.

For example, when the command sent from the ground specifies the mode 4, the data processing unit 120 assigns the D2 detector 112 to the E1 detector, the D3–D5 detectors 113–115 to the E2 detector, and the D6 detector 116 to the Epass detector. The data processing unit 120 also makes output through the R2 terminal to output the ROM address X and the ROM address Y to the ROM (B) 122, so that the addresses are read and output from the ROM (b) to the RAM (A) 124.

Consequently, even in the events of detector failures, the measurement mode can be directed from the ground to continue measurement.

The charged particle measuring apparatus of the present embodiment determines the presence or absence of a failure from the loss energy frequency data in the RAM (B) 125 as described above. Nevertheless, the presence or absence of a failure may also be determined from the loss energy frequency data in the RAM (A) 124. Now, description will be given of the method of determining the presence or absence of a failure from the loss energy frequency data in the RAM (A) 124.

As shown in FIGS. 7 and 8, the addresses to be stored in the ROM (A) 121 and the ROM (B) 122 are given the segment numbers of the segments which are established for the characteristic curves of each particle to be measured according to the respective modes. Here, for example, a zero address may be given to addresses other than those given the segment numbers while a RAM (A) 124 corresponding to the zero address is provided. Then, the loss energy frequency data in the RAM (A) 124 can be read to determine the presence or absence of a failure, depending on whether or not the loss energy frequency data at the zero address and the loss energy frequency data at the addresses given the segment numbers shown in FIGS. 7 and 8 except those of the measurement mode in question fall within pre-assumed frequencies. Incidentally, the failed detectors and the like are identified as in the foregoing case, i.e., by reading the loss energy frequency data in the RAM (B) 125.

As described above, the read cycle of the loss energy frequency data in the RAM (A) 124 is shorter than the read cycle of the loss energy frequency data in the RAM (B) 125. Since the loss energy frequency data in the RAM (A) 124 can be used to determine the presence or absence of a failure, a mode change against the failure can be made earlier.

As has been described, the charged particle measuring apparatus of the present invention offers the following effects. That is, since the relationship between the loss energy in the E1 detector and the loss energy in the E2 detector is counted up at the addresses of the RAM (A) 124 which are stored in the ROM (A) 121, it is possible discriminate the types of charged particles accurately and the energy channels precisely. Since high-energy charged particles penetrating the detectors are detected by the Epass detector and are counted up in the addresses of the RAM (A) 124 which are stored in the ROM (A) 121, the high-energy charged particles penetrating the detectors can be measured precisely. The charged particle measuring apparatus can be detected for a failure while conducting measurement, so that a mode corresponding to the failure can be directed from the ground to continue the measurement.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A charged particle measuring apparatus comprising:
   a first detector;
   a second detector; and
   a third detector arranged in the direction of incidence of charged particles;
   said second detector consisting of a plurality of detectors, with loss energy characteristics of respective types of charged particles to be measured being expressed in two-dimensional addresses with an output from said first detector as a first address and outputs from said plurality of detectors constituting said second detector as a second address, the loss energy characteristics of respective types of charged particles being measured based on said two-dimensional addresses and the presence or absence of output from said third detector, the apparatus further comprising:
   a first random access memory;
   a second random access memory for counting the number of times charged particles are measured for loss energy at said two-dimensional addresses, the loss energy characteristics of respective types of charged particles to be measured being expressed in said addresses;
   a read only memory containing segment numbers respectively given to a plurality of segments sections along the loss energy characteristics of respective types of charged particles to be measured, the loss energy characteristics of respective types of charged particles being expressed in said two-dimensional addresses with respect to each of a plurality of modes, said plurality of modes setting combinations of said first through third detectors excluding any one or more detectors for situations where said detector(s) out of said first detector, and/or said second detector consisting of said plurality of detectors, and/or said third detector suffer(s) a failure; and
   wherein the first random access memory is used for counting the number of times said charged particles are measured for loss energy under addresses shown by said segment numbers in said read only memory corresponding to said mode;
   wherein outputs from said first random access memory and said second random access memory are used to discriminate the types of charged particles and measure the energy thereof.

2. The charged particle measuring apparatus according to claim 1, wherein:
   said read only memory contains a segment number corresponding to all the addresses other than those given said segment numbers in each mode; and
   the apparatus further comprises a third random access memory for counting the number of times said charged particles are measured for loss energy under said segment number.

3. The charged particle measuring apparatus according to claim 1, wherein a segment, or a plurality of segments having the same segment numbers regardless of whether or not a charged particle penetrates said second detector, is divided into two segments each, depending on the presence or absence of the output from said third detector.

4. The charged particle measuring apparatus according to claim 1, wherein said plurality of detectors constituting said second detector are identical in thickness and material.

* * * * *